(12) United States Patent
Sano (10) Patent No.: US 6,766,387 B2
(45) Date of Patent: Jul. 20, 2004

(54) CELL FLOW CONTROL IN SQUARE-GRID EXPANDED ATM SWITCH

(75) Inventor: Kiyoshi Sano, Tokyo (JP)

(73) Assignee: NEC Corporation, Tokyo (JP)

( * ) Notice: Subject to any disclaimer, the term of this patent is extended or adjusted under 35 U.S.C. 154(b) by 234 days.

(21) Appl. No.: 09/861,710

(22) Filed: May 22, 2001

(65) Prior Publication Data

US 2001/0048664 A1 Dec. 6, 2001

(30) Foreign Application Priority Data

May 23, 2000 (JP) ........................................ 2000-151738

(51) Int. Cl.[7] .............................................. G06F 13/00
(52) U.S. Cl. .............................. 710/52; 710/7; 710/29; 710/53; 710/56; 710/57; 710/310; 370/395; 370/392
(58) Field of Search ................................ 710/7, 29, 52, 710/53, 56, 57, 310; 370/395, 392

(56) References Cited

U.S. PATENT DOCUMENTS 5,838,677 A * 11/1998 Kozaki et al. .............. 370/389
6,201,809 B1 * 3/2001 Lewin et al. ................ 370/392
6,324,165 B1 * 11/2001 Fan et al. .................... 370/232
6,426,940 B1 7/2002 Seo et al.
6,532,234 B1 * 3/2003 Yoshikawa et al. ......... 370/395

FOREIGN PATENT DOCUMENTS

| CN | 1212583 A | 3/1999 |
|---|---|---|
| JP | 10-276206 A | 10/1998 |

* cited by examiner

Primary Examiner—Jeffrey Gaffin
Assistant Examiner—Mohammad O. Farooq
(74) Attorney, Agent, or Firm—Foley & Lardner LLP (57) ABSTRACT

An a backpressure-type cell flow control for a square-grid expanded ATM switch achieving fair cell flow control between input port lines is disclosed. In a square-grid expanded switch, a backpressure controller generates a backpressure control signal when an amount of data stored in an output buffer exceeds a predetermined threshold, to avoid an overflow of the output buffer. When a backpressure control signal is generated by at least one of backpressure controllers belonging to a corresponding column, a common backpressure control signal is output to a plurality of input buffers storing data to be forwarded to an output port associated with the output buffer.

8 Claims, 6 Drawing Sheets

CELL FLOW CONTROL IN SQUARE-GRID EXPANDED ATM SWITCH

BACKGROUND OF THE INVENTION

1. Field of the Invention

The present invention relates to cell flow control techniques employing a backpressure control scheme in an ATM (Asynchronous Transfer Mode) switch, and in particular to a cell flow control method and system in a square-grid expanded ATM switch.

2. Description of Related Art

In some ATM switches having input and output buffers therein, a backpressure controller is provided to perform backpressure control to prevent call overflow in output buffers. Such a backpressure control has been disclosed in many publications. For example, see Japanese Patent Application Unexamined Publication Nos. 10-276206 and P2000-22716A.

There has been proposed a square-grid expanded ATM switch. Hereafter, taking a 2×2 square-grid expanded ATM switch as an example, a conventional cell flow control method applied to the square-grid expanded ATM switch and its disadvantages will be described with reference to FIGS. 1 and 2.

Figure 1:
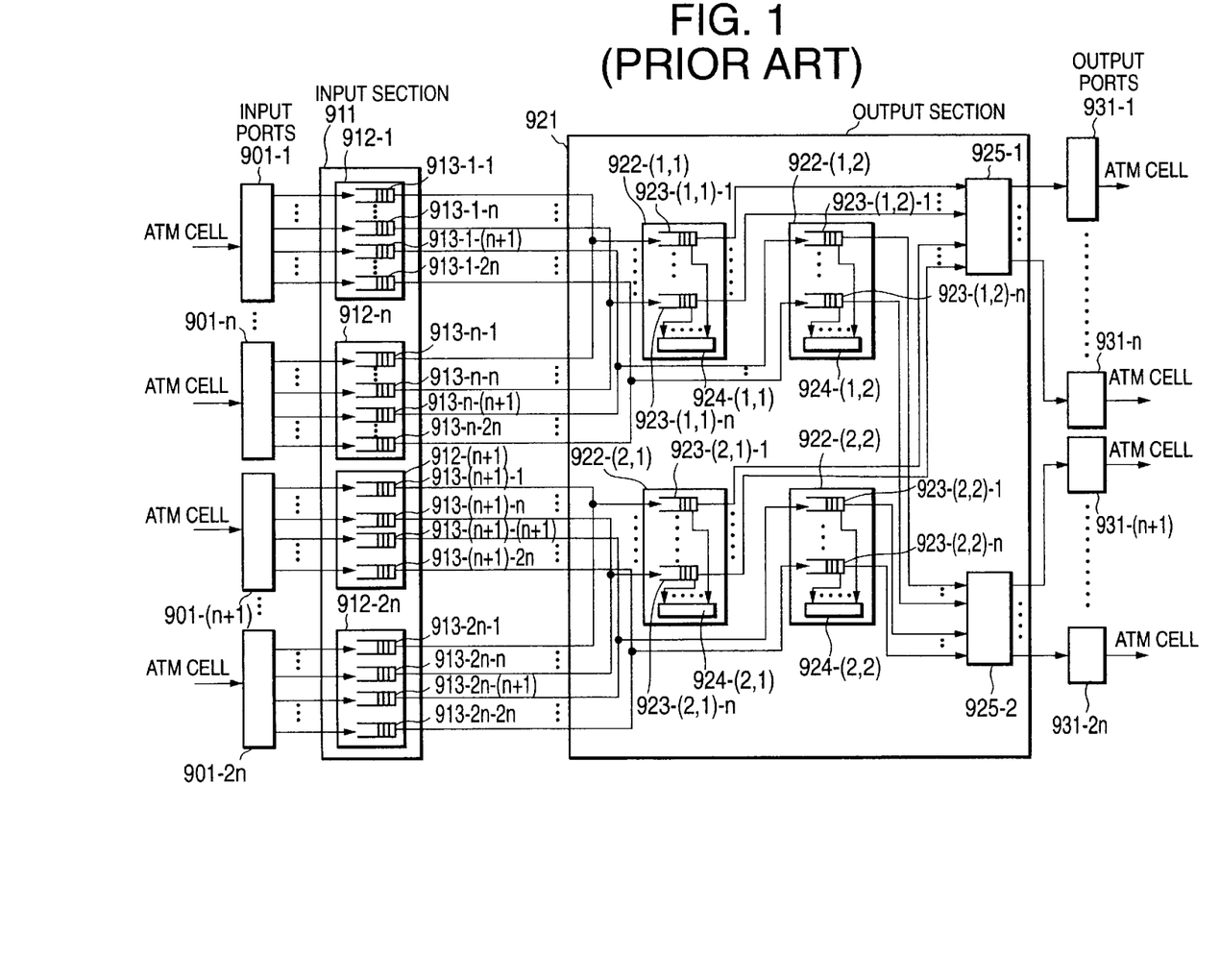
FIG. 1 is a block diagram showing an internal circuit configuration of a square-grid expanded ATM switch.

Referring to FIG. 1, the square-grid expanded ATM switch is provided with 2n input ports 901-1 to 901-2n, an input section 911, an output section 921, 2n output ports 931-1 to 931-2n.

The input section 911 has 2n input modules 912-1 to 912-2n therein. Each of the input modules 912-1 to 912-2n, which will be hereafter denoted by reference numeral 912-i (i=1, 2, . . . , 2n), includes input buffers 913-i-1 to 913-i-2n corresponding to respective ones of the 2n output ports 931-i to 931-2n.

Here, the 2n input ports 901-1 to 901-2n are divided into two input port lines: first input port line (or group) composed of n input ports 901-1 to 901-n; and second input port line (or group) composed of n input ports 901-(n/1) to 901-2n. Similarly, the 2n output ports 931-1 to 931-2n are divided into two output port lines; first output port line (or group) composed of n output ports 931-1 to 931-n; and second output port line (or group) composed of n output ports 931-(n+1) to 931-2n.

The output section 921 has 2×2 output modules 922-(1,1) 922-(1,2), 922-(2,1), and 922-(2,2) arrayed like a square grid. Each of the output modules will be hereafter denoted by reference numeral 922-(k, h), where k=1, 2 and h=1, 2. In other words, k indicates one of the first and second input port lines and h indicates one of the first and second output port lines. The output section 921 further has two output cell controllers 925-1 and 925-2, each of which will be denoted by reference numeral 925-h. Each output module 922-(k, h) includes n output buffers 923-(k, h)-1 to 923-(k, h)-n and a backpressure controller 924-(k, h).

Each input port 901-i receives a stream of ATM cells from a corresponding incoming line. The input port 901-i checks the header information of a received ATM cell to determine an output port. 931-j (j=1, 2, . . . , 2n) to which the ATM cell is forwarded and then outputs the ATM cell to an input buffer 913-i-j corresponding to the determined output port 931-j.

Each input buffer 913-i-j (i-1 to n, j-1 to n) outputs an ATM cell to an output buffer 923-(1, 1)-j. Each input buffer 913-i-(n+j) (i=1 to n, j=1 to n) outputs an ATM cell to an output buffer 923-(1, 2)-j. Each input buffer 913-(n+i)-j (i=1 to n, j=1 to n) outputs an ATM cell to an output buffer 923-(2, 1)-j. Each input buffer 913-(n+i)-(n+j) (i=1 to n, j=1 to n) outputs an ATM cell to an output buffer 923-(2, 2)-j.

Accordingly, output modules 922-(k, h) on the same row handle ATM cells received at the same input port line and output modules 922-(k, h) on the same column handle ATM cells to be forwarded to the same output port line. In other words, the output modules 922-(k, h) are arrayed in a row for each input port line and in a column for each output port line.

In this example, the output modules 922-(1, h) on the first row belong to the first input port line and the output modules 922-(2, h) on the second row belong to the second input port line. The output modules 922-(k, 1) on the first column belong to the first output port line and the output modules 922-(k, 2) on the second column belong to the second output port line.

In association with this, the first input port line includes the input ports 901-1 to 901-n, input modules 912-1 to 912-n, input buffers 913-1-1 to 913-1-2n, . . . , 913-n-1 to 913-n-2n, and output buffers 923-(1,1)-1 to 923-(1,1)-n, 923-(1,2)-1 to 923-(1,2)-n. The second input port line includes the input ports 901-(n+1) to 901-2n, input modules 912-(n+1) to 912-2n, input buffers 913-(n+1)-1 to 913-(n+1)-2n, . . . 913-2n-1 to 913-2n-2n, and output buffers 923-(2,1)-1 to 923-(2,1)-n, 923-(2,2)-1 to 923-(2,2)-n.

Further, the first output port line includes the output ports 931-1 to 931-n, output cell controller 925-1, output buffers 923-(1,1)-1 to 923-(1,1)-n, 923-(2,1)-1 to 913-(2,1)-n, and input buffers 913-1-1 to 913-1-n, . . . , 913-2n-1 to 913-2n-n. The second output port line includes the output ports 931-(n+1) to 931-2n, output cell controller 925-2, output buffers 923-(1,2)-1 to 923-(1,2)-n, 923-(2,2)-1 to 913(2,2)-n, and input buffers 913-1-(n+1) to 913-1-2n, . . . , 913-2n-(n+1) to 913-2n-2n.

ATM cells read out from the output buffer 923-(1,1)-j (j=1 to n) are forwarded to a corresponding outgoing line through the output cell controller 925-1 and the output port 931-j. ATM cells read out from the output buffer 923-(1,2)-j (j=1 to n) are forwarded to a corresponding outgoing line through the output cell controller 925-2 and the output port 931-(n+1). ATM cells read out from the output buffer 923-(2,1)-j (j=1 to n) are forwarded to a corresponding outgoing line through the output cell controller 925-1 and the output port 931-j. ATM cells read out from the output buffer 923-(2,2)-j (n=1 to n) are forwarded to a corresponding outgoing line through the output cell controller 925-2 and the output port 931-(n/j).

The output cell controller 925-1 performs arbitration of forwarding ATM cells from the output buffer 923-(1, 1)-(j–1 to n) to the output port 931-j and ATM cells from the output buffer 923-(2,1)-j (i=1 to n) to the output port 931-j so as to avoid contention for the output port 931-j. The output cell controller 925-2 performs arbitration of forwarding ATM cells from the output buffer 923-(1,2)j (j=1 to n) to the output port 931-(n+j) and ATM cells from the output buffer 923-(2,2)-j (j–1 to n) to the output port 931-(n+j) so as to avoid contention for the output port 931-(n+j), In the above ATM switch of FIG. 1, a conventional backpressure-type cell flow control system will be described hereafter.

Figure 2:
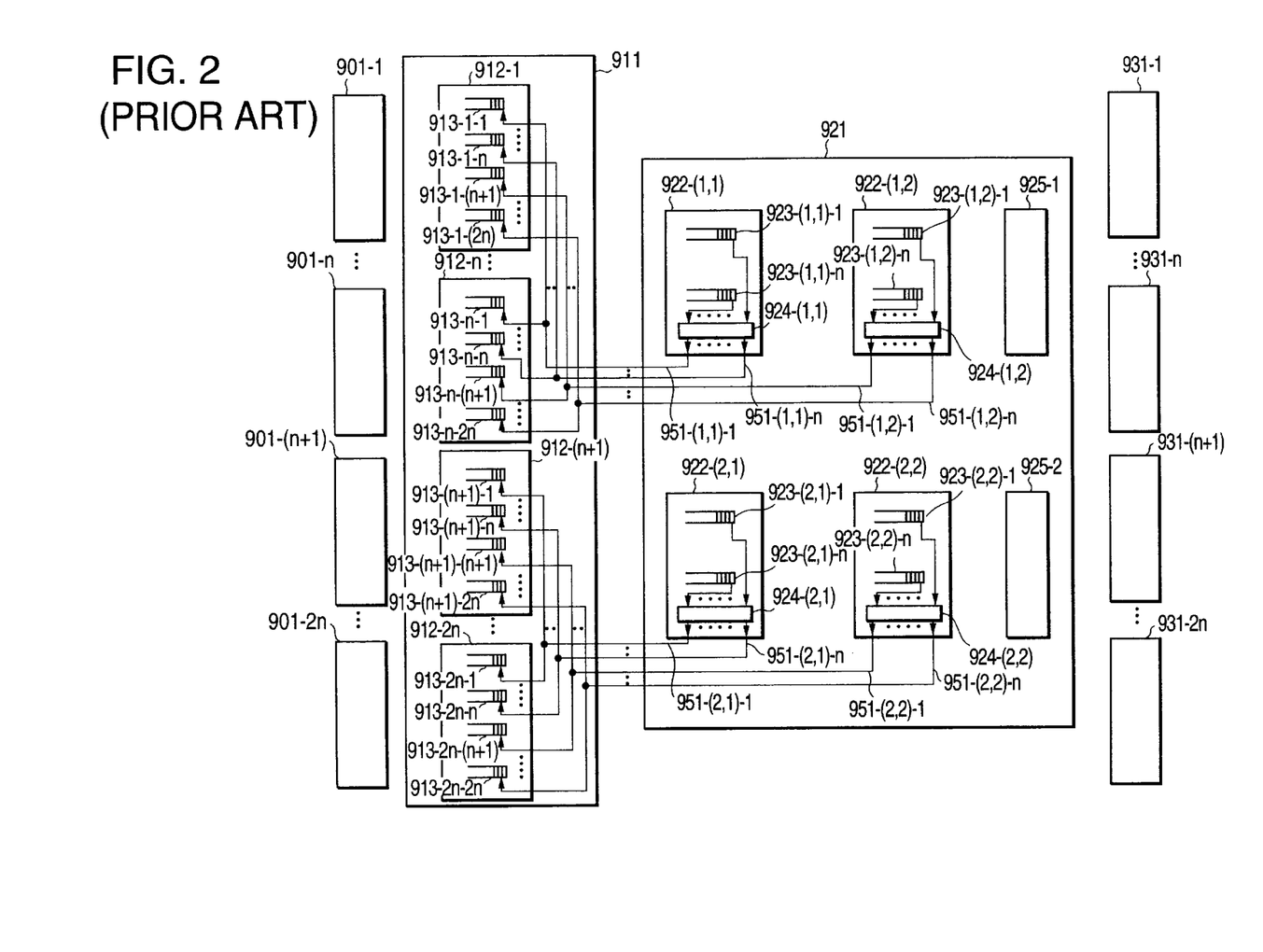
FIG. 2 is a block diagram showing a conventional backpressure-type cell flow control system in the square-grid expanded ATM switch.

Referring to FIG. 2, the backpressure controller 924-(1,1) determines whether an occupation rate of ATM cells in the output buffer 923-(1, 1)-j (j–1 to n) exceeds a threshold and, if the occupation rate exceeds the threshold, then outputs a backpressure control signal 951-(1,1)-j to the input buffer 913-i-j (i=1 to n). The backpressure controller 924-(1,2)

determines whether an occupation rate of ATM cells in the output buffer 923-(1,2)-j (j=1 to n) exceeds a threshold and, if the occupation rate exceeds the threshold, then outputs a backpressure control signal 951-(1,2)-j to the input buffer 913-i-(n+j) (i=1 to n). The backpressure controller 924-(2,1) determines whether an occupation rate of ATM cells in the output buffer 923-(2, 1)-j (j=1 to n) exceeds a threshold and, if the occupation rate exceeds the threshold, then outputs a backpressure control signal 951-(2,1)-j to the input buffer 913-(n+i)-j (i=1 to n). The backpressure controller 924-(2,2) determines whether an occupation rate of ATM cells in the output buffer 923-(2,2)-j (j=1 to n) exceeds a threshold and, if the occupation rate exceeds the threshold, then outputs a backpressure control signal 951-(2,2)-j to the input buffer 913-(n+i)-(n+j) (i=1 to n).

When receiving the backpressure control signal 951(1,1)-j, the input buffer 913-i-i (i=1 to n) stops outputting an ATM cell to the output buffer 923-(1,1)-j. When receiving the backpressure control signal 951-(1,2)-j, the input buffer 913-i-(n+j) (i=1 to n) stops outputting an ATM cell to the output buffer 923-(1,2)-j. When receiving the backpressure control signal 951-(2,1)-j, the input buffer 913-(n+i)-j (i=1 to n) stops outputting an ATM cell to the output buffer 923-(2,1)-j. When receiving the backpressure control signal 951-(2,2)-j, the input buffer 913-(n+i)-(n+j) (i=1 to n) stops outputting an ATM cell to the output buffer 923-(2,2)-j. In this manner, ATM cells are prevented from overflowing the output buffer 923-(h, m))-j (h=1, 2, m=1, 2, j=1 to n).

However, the above backpressure-type cell flow control has the following disadvantages.

In the case where the backpressure controller 924-(1,1) determines that an overflow occurs in the output buffer 923-(1,1)-1 for example, the backpressure control signal 951-(1,1)-1 causes the input buffer 913-i-1 (i=1 to n) to be inhibited from outputting ATM cells to the output buffer 923-(1, 1)-1. At this time, if no overflow occurs in the output buffer 923-(2,1)-1, then the backpressure controller 924-(2, 1) does not output any backpressure control signal 951-(2, 1)-1, so that the input buffer 913-(n+i)-1 (i=1 to n) is not inhibited from outputting ATM cells to the output buffer 923-(2, 1)-1.

Therefore, oven though these ATM cells are to be forwarded to the same output port 931-1, the ATM cells stored in the input buffer 913-i-1 are inhibited and the ATM cells stored in the input buffer 913-(n+i)-1 are permitted. Similarly, even though ATM cells are to be forwarded to the same output port 931-j (j=1 to 2n), the ATM cells stored in the input buffer 913-i-j (i=1 to 2n) are inhibited and the ATM cells stored in the input buffer 912-(n+i)-j are permitted.

In other words, an unfair backpressure-type cell flow control is performed between the first input port line including input ports 901-1 to 901-n and the second input port line including input ports 901-(n+1) to 901-2n.

SUMMARY OF THE INVENTION

Therefore, an object of the present invention is to provide a backpressure-type cell flow control method and system to a square-grid expanded ATM switch achieving fair cell flow control between input port lines.

According to an aspect of the present invention, a flow control system in a square-grid expanded switch having an array of output buffer modules having a plurality of rows and columns, wherein one output port is associated with a plurality of output buffers each belonging to different rows and same column, the system includes: a backpressure controller provided in each of the output buffer modules for generating a backpressure control signal when an amount of data stored in an output buffer included in a corresponding output buffer module exceeds a predetermined threshold, to avoid an overflow of the output buffer; and a common backpressure generator provided in each of the output buffer modules, for generating a common backpressure control signal when a backpressure control signal is generated by at least one of backpressure controllers provided in output buffer modules belonging to a corresponding column and outputs the common backpressure control signal to a plurality of input buffers storing data to be forwarded to an output port associated with the output buffer.

According to another aspect of the present invention, in a square-grid expanded swatch comprising: M×N input ports, where M and N are integers; M×N output ports; M×N input modules corresponding to respective ones of the M×N input ports, each of the input modules including M×N input buffers corresponding to respective ones of the M×N output ports; an M×M array to output butter modules, wherein M rows of the array are associated with respective ones of M input port groups obtained by dividing the M×N input ports by N, M columns of the array are associated with respective ones of M output port groups obtained by dividing the M×N output ports by N, and each of the output buffer modules includes N output buffers, wherein each of the M×N output ports is associated with a corresponding output buffer included in each of M output buffer modules on a corresponding column, wherein each of the N output buffers is associated with N corresponding input buffers included in respective ones of N input modules of a corresponding input port group, the system includes: a backpressure controller provided in each of the output buffer modules, wherein the backpressure controller generates a backpressure control signal when an amount of data stored in each output buffer included in a corresponding output buffer module exceeds a predetermined threshold, to avoid an overflow of the output buffer; and a common backpressure generator provided in each of the output buffer modules, wherein the common backpressure generator generates a common backpressure control signal when a backpressure control signal is generated by at least one of backpressure controllers provided in output buffer modules belonging to a corresponding column and outputs the common backpressure control signal to M×N input buffers associated with the output buffer and (X−1) corresponding output buffers included in respective ones of (M−1) output buffer modules belonging to the corresponding column.

The common backpressure generator may be an array of OR gates connected to the backpressure controller, wherein each of the OR gates combines the backpressure control signal, generated by the backpressure controller and another backpressure control signal generated by another backpressure controller belonging in the corresponding column to produce the common backpressure control signal and outputs it to the N input buffers associated with the output buffer and a corresponding OR gate of another array of OR gates connected to another backpressure controller belonging in the corresponding column.

The common backpressure generator may be an array of maximum value detectors connected to the backpressure controller, wherein each of the maximum value detectors detects a maximum backpressure control signal among backpressure control signals generated by the backpressure controller and other backpressure controllers belonging in the corresponding column to output the maximum backpressure control signal as the common backpressure control signal to the N input buffers associated with the output buffer and a corresponding maximum value detector of another array of maximum value detectors connected to another backpressure controller belonging in the corresponding column.

DESCRIPTION OF THE PREFERRED EMBODIMENTS

A backpressure-type cell flow control according to the present invention will be described hereafter, taking the square-grid expanded ATM switch of FIG. 1 as an example.

Figure 3:
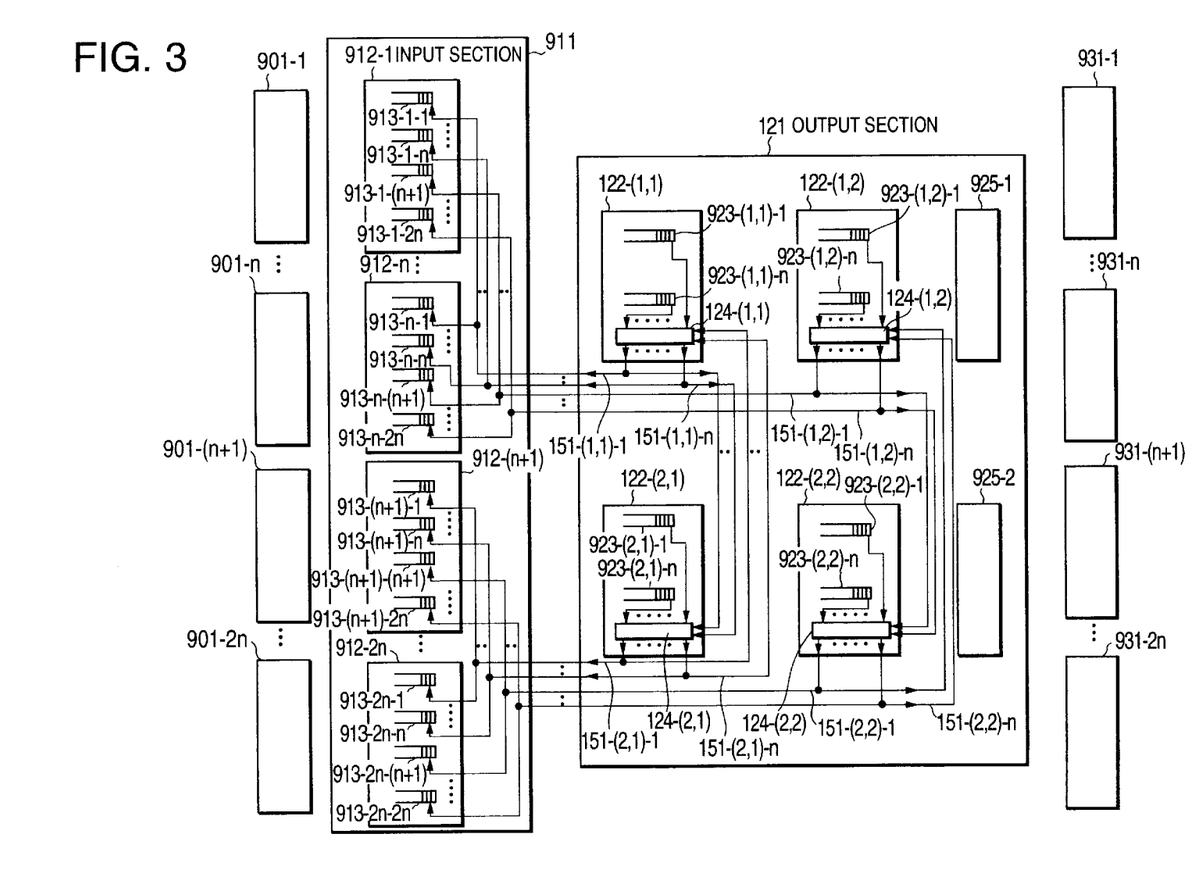
FIG. 3 is a block diagram showing a backpressure-type cell flow control system in the square-grid expanded ATM switch according to an embodiment of the present invention.

In FIG. 3, a backpressure-type cell flow control system according to an embodiment of the present invention is implemented in the square-grid expanded ATM switch of FIG. 1, where blocks similar to those previously described with reference to FIGS. 1 and 2 are denoted by the same reference numerals and cell flowing paths as shown in FIG. 1 are omitted in FIG. 3 for simplicity.

Referring to FIG. 3, the square-grid expanded ATM switch is provided with an output section 121, which has four output modules 122-(1,1), 122-(1,2), 122-(2,1), and 122-(2,2) arrayed like a square grid. Each of the four output modules will be hereafter denoted by reference numeral 122-(k, h) (k−1, 2, h=1, 2). The output section 121 further has two output cell controllers 925-1 and 925-2, each of which will be denoted by reference numeral 925-h. Each output module 122-(k, h) includes n output buffers 923-(k, h)-1 to 923-(k, h)-n and a backpressure controller 124-(k, h).

The backpressure controller 124-(k, h) has an OR function (see FIG. 4) as well as the same function as the backpressure controller 924-(k, h) to produce a backpressure control signal 151-(k, h)-i (j=1 to n) instead of the backpressure control signal 951-(k, h)-j.

The backpressure controller 124-(1,1) outputs a backpressure control signal 151(1,1)-j to the input buffer 913-i-j (i=1 to n) as well as the backpressure controller 124-(2,1). The backpressure controller 124-(2, 1) outputs a backpressure control signal 151-(2,1)-j to the input buffer 913-(n+i)-1 (i=1 to n) as well as the backpressure controller 124-(1,1). The backpressure controller 124-(1,2) outputs a backpressure control signal 151-(1,2)-j to the input buffer 913-i-(n+j) (i=1 to n) as well as the backpressure controller 124-(2,2). The backpressure controller 124-(2,2) outputs a backpressure control signal 151-(2,2)-j to the input buffer 913-(n+i)-(n+j) (i−1 to n) as well as the backpressure controller 124-(1,2).

Figure 4:
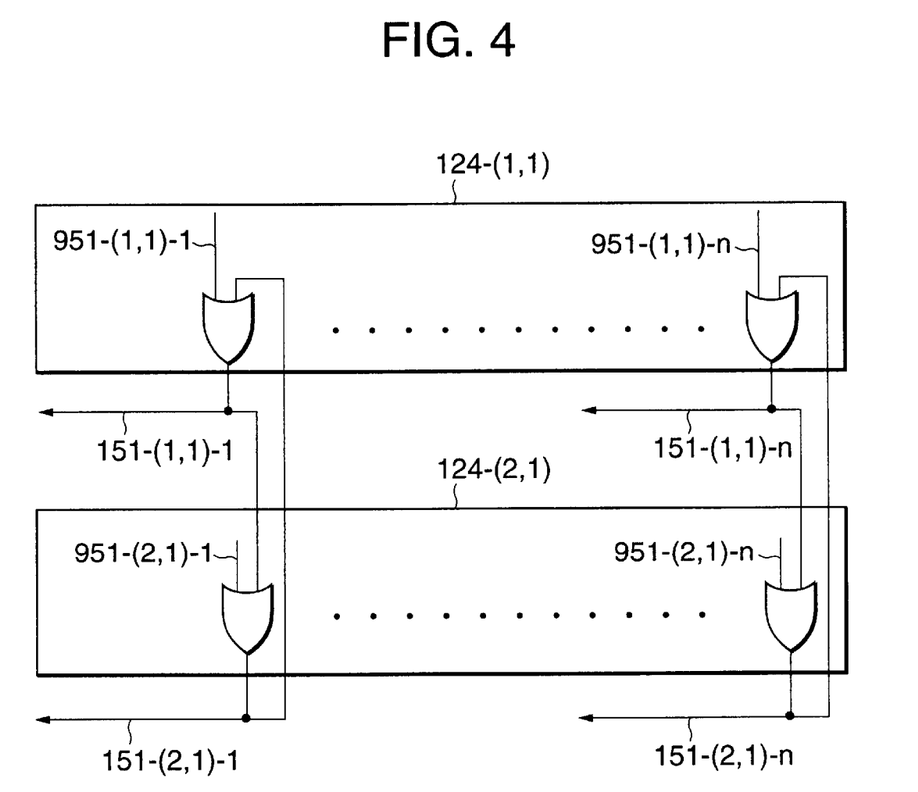
FIG. 4 is a diagram showing a circuit of backpressure control signals of FIG. 3.

As shown in FIG. 4, the backpressure controller 124-(1,1) includes the same function as the backpressure controller 924-(1, 1) to produce each backpressure control signal 951-(1,1)-j (j=1 to n). In addition, the backpressure controller 124-(1,1) is provided with an OR gate for calculating a logical OR of the pressure control signal 951-(1,1)-j and a corresponding backpressure control signal 151-(2,1)-j received from the backpressure controller 124-(2,1). The output of each OR gate is output as the backpressure control signal 151-(1,1)-j to the input buffer 913-i-j (i=1 to n) as well as the backpressure controller 124-(2,1).

Similarly, the backpressure controller 124-(2,1) includes the same function as the backpressure controller 924-(2, 1) to produce each backpressure control signal 951-(2,1)-j (j=1 to n). In addition, the backpressure controller 124-(2,1) is provided with an OR gate for calculating a logical OR of the pressure control signal 951-(2,1)-j and a corresponding backpressure control signal 151-(1,1)-j received from the backpressure controller 124-(1,1). The output of each OR gate is output as the backpressure control signal 151-(2,1)-j to the input buffer 913-(n+i)-j (i=1 to n) as well as the backpressure controller 124-(1,1).

Accordingly, the backpressure control signals 151-(1,1)-j and 151-(2, 1)-j are concurrently made active when at least one of the backpressure control signals 951-(1,1)-j and 951-(2,1)-j becomes active. In other words, when at least one of the cell occupation rates of the output buffers 923-(1,1)-j and 923-(2,1)-j exceeds the predetermined threshold, the backpressure is applied to the input buffers 913-i-j (i=1 to 2n) to inhibit it from outputting ATM cells.

Therefore, it is possible to avoid an overflow of both output buffers 923-(1,1)-j and 923-(2,1)-j and further to eliminate an unfair backpressure control between the first input port line of input buffers 913-i-j and the second input port line of input buffers 913-(n+i)-j.

Since the circuit and operation of the backpressure controllers 124-(1,2) and 124-(2,2) are the same as those of the backpressure controllers 124-(1,1) and 124-(2,1), the details thereof are omitted.

Figure 5:
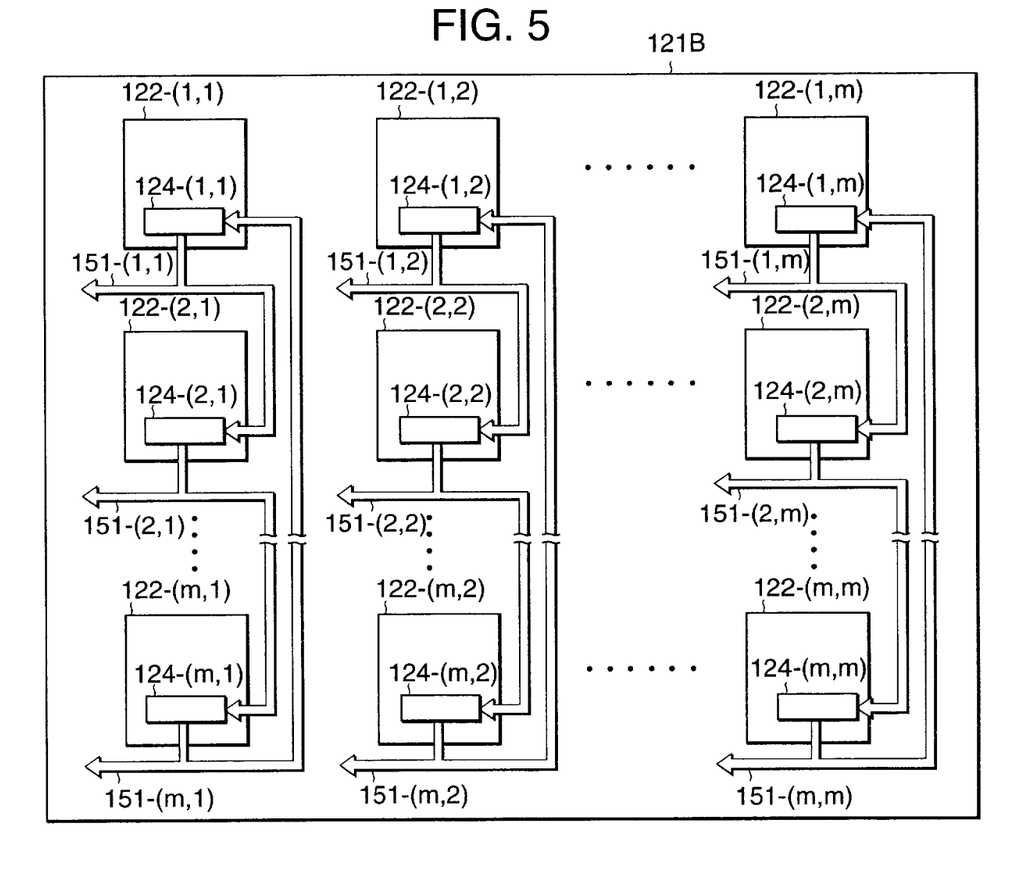
FIG. 5 is a block diagram showing a generalized circuit of a backpressure-type cell flow control system in the square-grid expanded ATM switch according to the embodiment of the present invention.

Referring to FIG. 5, in the case of an m×m square-grid expanded ATM switch, where m is an integer greater than 2, an output section 121B has m×m output modules 122-(k, h) (k=1 to m, and h=1 to m) arrayed like a square grid. The output section 121B further has m output cell controllers (not shown), each of which performs arbitration among m output buffers. Each output module 122-(k, h) includes n output buffers (not shown) and a backpressure controller 124-(k, h). In this generalized case, the number of input buffers provided in a single input module is m×n.

Figure 6:
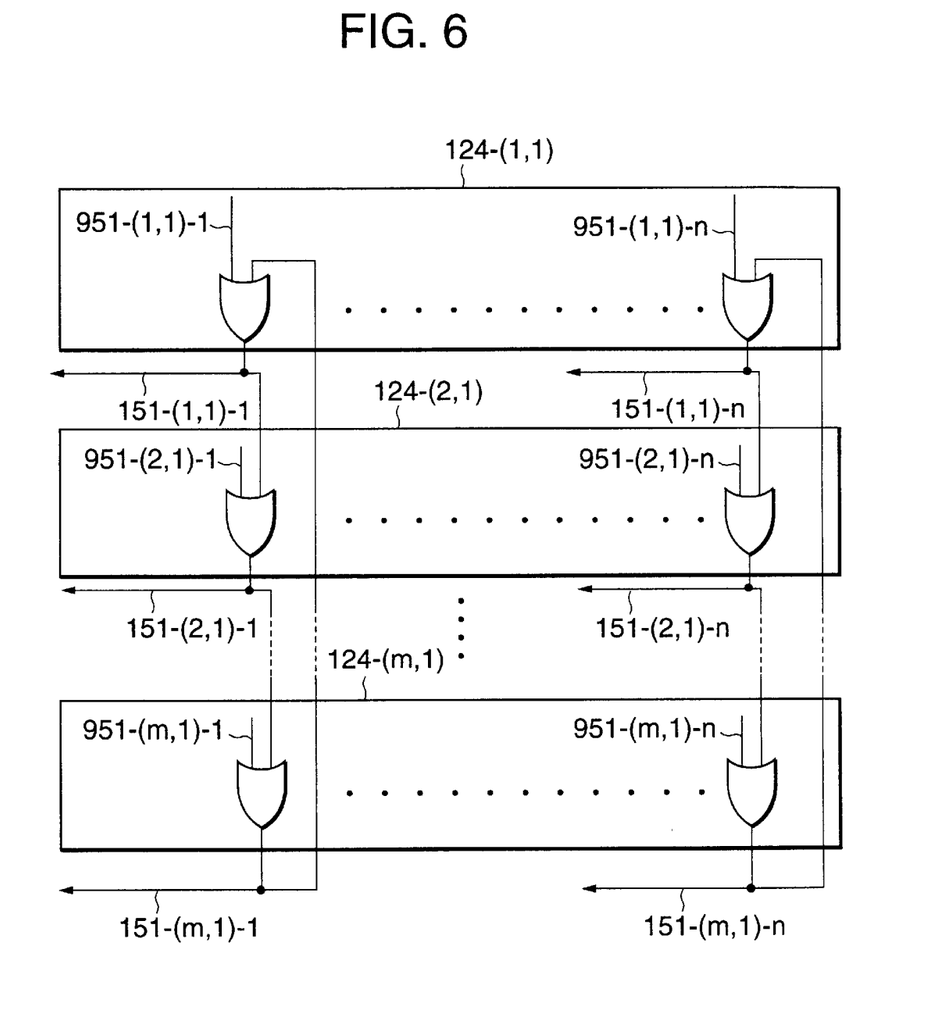
FIG. 6 is a diagram showing a circuit of backpressure control signals of FIG. 5.

Referring to FIG. 6, the backpressure controller 124-(k, 1) is provided in each output module 122-(k,l), where k=1 to m. The backpressure controller 124-(1,l) includes the same function as the backpressure controller 924-(1,l) to produce each backpressure control signal 951-(1,l)-j (j=1 to n). In addition, the backpressure controller 124-(1,1) is provided with an OR gate for calculating a logical OR of the pressure control signal 951-(1,l)-j and a corresponding backpressure control signal 151-(m,1)-j received from the backpressure controller 124-(m,1). The output of each OR gate is output as the backpressure control signal 151-(1,l)-j to the input buffer as well as the backpressure controller 124-(2,1).

The backpressure controller 124-(2,l) includes the same function as the backpressure controller 924-(2,1) to produce each backpressure control signal. 951-(2,1)-j (j=1 to n). In addition, the backpressure controller 124-(2,1) is provided with an OR gate for calculating a logical OR of the pressure control signal 951-(2,1)-j and a corresponding backpressure control signal 151-(l,l)-j received from the backpressure controller 124-(1,1). The output of each OR gate is output as the backpressure control signal 151-(2,1)-j to the input buffer as well as the backpressure controller 124-(3,l). It is the same with the backpressure controllers 124-(3,1) to 124-(m-l,1).

The backpressure controller 124-(m,1) includes the same function as the backpressure controller 924-(m,1) to produce each backpressure control signal 951-(m,1)-j (j=1 to n). In addition, the backpressure controller 124-(m,1) is provided with an OR gate for calculating a logical OR of the pressure control signal 951-(m,1)-j and a corresponding backpressure control signal 151-(m-l, l)-j received from the backpressure controller 124-(m-1, 1). The output of each OR gate is output as the backpressure control signal 151-(m,1)-j to the input buffer as well as the backpressure controller 124-(1,1).

In other words, the backpressure controllers 124-(1,1) to 124-(m,1) in the first column belonging to the same output port line outputs a logical OR of all the backpressure signals generated thereby to the input buffers belonging to the same output port line.

Since the circuit and operation of the backpressure controllers in the other columns are the same as those of the backpressure controllers 124-(1,1) to 124-(m,1), the details thereof are omitted.

In the above embodiment, a backpressure control signal 951-(k, h)-j or 151-(k, h)-j is a binary signal indicating one of active and inactive, which mean respective ones of applying backpressure and no backpressure.

As another embodiment, it is possible to use a multi-value signal or an analog signal as a backpressure control signal to indicate the strength of backpressure. For example, a backpressure control signal having a higher value or a higher voltage inhibits a corresponding input buffer from outputting ATM cells for a longer time period or at lower cell output rate. In this embodiment, the backpressure controller outputs a backpressure control signal 151-(k, h)-j having the maximum value among the backpressure control signals 951-(k, h)-j. In this case, the OR gate provided in each backpressure controller may be replaced with a peak detector.

In the above embodiments, an ATM switch with input-output buffers is employed. The present invention is not restricted to this type of ATM switch. Any ATM switch of a square-grid expanded type can be employed.

What is claimed is:

1. A flow control system in a square-grid expanded switch having an array of output buffer modules having a plurality of rows and columns each output buffer module having a plurality of output buffers, wherein one output port is associated with a plurality of output buffer modules each belonging to different rows and the same column, the system comprising:

a backpressure controller provided in each of the output buffer modules, for generating a backpressure control signal when an amount of data stored in an output buffer of any said output buffers included in a corresponding output buffer module exceeds a predetermined threshold, to avoid an overflow of any of said plurality of the output buffer; and a common backpressure generator provided in each of the output buffer modules, for generating a common backpressure control signal when a backpressure control signal is generated by at least one of backpressure controllers provided in output buffer modules belonging only to a corresponding column and outputs the common backpressure control signal to a plurality of input buffers storing data to be forwarded to an output port associated with the output buffer.

2. A flow control system in a square-grid expanded switch comprising:

M×N input ports, where M and N are integers;

M×N output ports;

M×N input modules corresponding to respective ones of the M×N input ports, each of the input modules including M×N input buffers corresponding to respective ones of the M×N output ports;

an M×M array of output buffer modules, wherein
M rows of the array are associated with respective ones of M input port groups obtained by dividing the M×N input ports by N,
M columns of the array are associated with respective ones of M output port groups obtained by dividing the M×N output ports by N, and
each of the output buffer modules includes N output buffers, wherein each of the M×N output ports is associated with a corresponding output buffer included in each of M output buffer modules on a corresponding column, wherein each of the N output buffers is associated with N corresponding input buffers included in respective ones of N input modules of a corresponding input port group, the system comprising:
a backpressure controller provided in each of the output buffer modules, wherein the backpressure controller generates a backpressure control signal when an amount of data stored in each output buffer included in a corresponding output buffer module exceeds a predetermined threshold, to avoid an overflow of the output buffer; and
a common backpressure generator provided in each of the output buffer modules, wherein the common backpressure generator generates a common backpressure control signal when a backpressure control signal is generated by at least one of backpressure controllers provided in output buffer modules belonging only to a corresponding column and outputs the common backpressure control signal to M×N input buffers associated with the output buffer and (M−1) corresponding output buffers included in respective ones of (M−1) output buffer modules belonging to the corresponding column.

3. The flow control system according to claim 2, wherein the common backpressure generator comprises:

an array of OR gates connected to the backpressure controller, wherein each of the OR gates combines the backpressure control signal generated by the backpressure controller and another backpressure control signal generated by another backpressure controller belonging only to the corresponding column to produce the common backpressure control signal and outputs the common backpressure control signal only to the N input buffers associated with the output buffer and, outputs the common backpressure control signal only to a corresponding OR gate of another array of OR gates connected to another backpressure controller belonging to the corresponding column.

4. The flow control system according to claim 2, wherein the common backpressure generator comprises:

an array of maximum value detectors connected to the backpressure controller, wherein each of the maximum value detectors detects a maximum backpressure control signal among backpressure control signals generated by the backpressure controller and other backpressure controllers belonging only to the corresponding column to output the maximum backpressure control signal as the common backpressure control signal to the N input buffers associated with the output buffer and a corresponding maximum value detector of another array of maximum value detectors connected to another backpressure controller belonging in the corresponding column.

5. A flow control method for use in a square-grid expanded switch having an array of output buffer modules having a plurality of rows and columns, each buffer module having a plurality of output buffers, wherein one output port is associated with a plurality of output buffer modules each belonging only to different rows and the same column, the method comprising the steps of:

determining whether an amount of data stored in an output buffer included in a corresponding output buffer module exceeds a predetermined threshold;

when an amount of data stored in the output buffer exceeds the predetermined threshold, generating a backpressure control signal to avoid an overflow of the output buffer;

in each column of output buffer modules, independently generating a common backpressure control signal when a backpressure control signal is generated in at least one of output buffer modules belonging to a corresponding column;

supplying the common backpressure control signal to a plurality of input buffers storing data to be forwarded to an output port associated with the output buffer; and for each column, supplying the common backpressure control signal only to one or more of said output buffer modules belonging to said corresponding column.

6. In a square-grid expanded switch comprising:

M×N input ports, where M and N are integers;

M×N output ports;

M×N input modules corresponding to respective ones of the M×N input ports, each of the input modules including M×N input buffers corresponding to respective ones of the M×N output ports;

an M×M array of output buffer modules, wherein
M rows of the array are associated with respective ones of M input port groups obtained by dividing the M×N input ports by N, M columns of the array are associated with respective ones of M output port groups obtained by dividing the M×N output ports by N, and each of the output buffer modules includes N output buffers, wherein each of the M×N output ports is associated with a corresponding output buffer included in each of M output buffer modules on a corresponding column, wherein each of the N output buffers is associated with N corresponding input buffers included in respective ones of N input modules of a corresponding input port group, a flow control method comprising the steps of:

a) generating a backpressure control signal when an amount of data stored in each output buffer included in a corresponding output buffer module exceeds a predetermined threshold, to avoid an overflow of the output buffer; and b) generating a common backpressure control signal when a backpressure control signal is generated in at least one output buffer modules belonging to a corresponding column; and c) outputting the common backpressure control signal to M×N input buffers associated with the output buffer and only to the (M−1) corresponding output buffers included in respective ones of (M−1) output buffer modules belonging only to the corresponding column.

7. The flow control method according to claim 6, wherein the step (c) comprises the step of:

combining the backpressure control signal and another backpressure control signal generated by another output buffer module belonging only to the corresponding column to produce the common backpressure control signal.

8. The flow control method according to claim 6, wherein the step (c) comprises the step of:

detecting a maximum backpressure control signal among backpressure control signals generated by at least one output buffer modules belonging only to the corresponding column to produce the common backpressure control signal.

* * * * *